United States Patent
Ameres et al.

(10) Patent No.: US 8,942,290 B2
(45) Date of Patent: Jan. 27, 2015

(54) DYNAMIC COEFFICIENT REORDERING

(75) Inventors: Eric Ameres, Cohoes, NY (US); James Bankoski, Los Gatos, CA (US); Scott Lavarnway, Warrensburg, NY (US); Yaowu Xu, San Diego, CA (US); Dan Miller, New York, NY (US); Adrian Grange, Cambridge (GB); Paul Wilkins, Cambridge (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/599,315

(22) Filed: Aug. 30, 2012

(65) Prior Publication Data

US 2012/0320989 A1    Dec. 20, 2012

Related U.S. Application Data

(63) Continuation of application No. 10/713,807, filed on Nov. 14, 2003, now Pat. No. 8,824,553.

(60) Provisional application No. 60/469,187, filed on May 12, 2003.

(51) Int. Cl.

| | | |
|---|---|---|
| *H04N 7/12* | (2006.01) | |
| *H04N 19/117* | (2014.01) | |
| *H04N 19/523* | (2014.01) | |
| *H04N 19/114* | (2014.01) | |
| *H04N 19/154* | (2014.01) | |
| *H04N 19/139* | (2014.01) | |
| *H04N 19/152* | (2014.01) | |
| *H04N 19/14* | (2014.01) | |
| *H04N 19/51* | (2014.01) | |
| *H04N 19/129* | (2014.01) | |
| *H04N 19/172* | (2014.01) | |
| *H04N 19/156* | (2014.01) | |
| *H04N 19/177* | (2014.01) | |
| *H04N 19/13* | (2014.01) | |

(52) U.S. Cl.
CPC ..... *H04N 19/00066* (2013.01); *H04N 19/0063* (2013.01); *H04N 19/00054* (2013.01); *H04N 19/002* (2013.01); *H04N 19/00151* (2013.01); *H04N 19/00193* (2013.01); *H04N 19/00157* (2013.01); *H04N 19/00696* (2013.01); *H04N 19/00109* (2013.01); *H04N 19/00266* (2013.01); *H04N 19/00206* (2013.01); *H04N 19/00284* (2013.01); *H04N 19/00121* (2013.01)
USPC .................................................. 375/240.18

(58) Field of Classification Search
None
See application file for complete search history.

(56) References Cited

U.S. PATENT DOCUMENTS

| | | |
|---|---|---|
| 4,710,810 A | 12/1987 | Koga |
| 4,816,906 A | 3/1989 | Kummerfeldt et al. |
| 4,924,310 A | 5/1990 | von Brandt |
| 5,091,782 A | 2/1992 | Krause et al. |
| 5,148,269 A | 9/1992 | de Haan et al. |
| 5,337,086 A | 8/1994 | Fujinami |
| 5,365,280 A | 11/1994 | De Haan et al. |
| 5,377,018 A | 12/1994 | Rafferty |
| 5,398,068 A | 3/1995 | Liu et al. |
| 5,461,423 A | 10/1995 | Tsukagoshi |
| 5,512,952 A | 4/1996 | Iwamura |
| 5,557,341 A | 9/1996 | Weiss et al. |
| 5,686,962 A | 11/1997 | Chung et al. |
| 5,689,306 A | 11/1997 | Jung |
| 5,706,059 A | 1/1998 | Ran et al. |
| 5,731,840 A | 3/1998 | Kikuchi et al. |
| 5,737,020 A | 4/1998 | Hall et al. |
| 5,767,909 A | 6/1998 | Jung |
| 5,777,680 A | 7/1998 | Kim |
| 5,812,197 A | 9/1998 | Chan et al. |
| 5,818,536 A | 10/1998 | Morris et al. |
| 5,886,742 A | 3/1999 | Hibi et al. |
| 5,912,707 A | 6/1999 | Kim |
| 5,926,212 A | 7/1999 | Kondo |
| 5,926,226 A | 7/1999 | Proctor et al. |
| 5,991,447 A | 11/1999 | Eifrig et al. |
| 6,005,980 A | 12/1999 | Eifrig et al. |

(Continued)

FOREIGN PATENT DOCUMENTS

| | | |
|---|---|---|
| EP | 0634873 | 1/1995 |
| EP | 0634873 B1 | 9/1998 |

(Continued)

OTHER PUBLICATIONS

Nokia, Inc., Nokia Research Center, "MVC Decoder Description", Telecommunication Standardization Sector, Study Period 1997-2000, Geneva, Feb. 7, 2000, 99 pp.

Series H: Audiovisual and Multimedia Systems, "Infrastructure of audiovisual services—Coding of moving video, Video coding for low bit rate communication", International Telecommunication Union, ITU-T Recommendation H.263, Feb. 1998, 167 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Chen, Xing C., et al.; "Quadtree Based Adaptive Lossy Coding of Motion Vectors", IEEE 1996, 4 pp.

(Continued)

*Primary Examiner* — Mehrdad Dastouri
*Assistant Examiner* — James Anderson, II
(74) *Attorney, Agent, or Firm* — Young Basile Hanlon & MacFarlane P.C.

(57) ABSTRACT

A system, apparatus, and method of compressing video data having at least one frame having at least one block having an array of pixels. The method includes transforming the pixels of the at least one block into coefficients, creating a default transmission order of the coefficients, creating an optimal transmission order of the coefficients, comparing a coefficient position of at least one of the coefficients in the optimal transmission order with a coefficient position of the at least one of the coefficients in the default transmission order; determining an update value based on the comparison, and selectively encoding position information of the at least one of the coefficients in the optimal transmission order based on the update value.

16 Claims, No Drawings

(56) References Cited

U.S. PATENT DOCUMENTS

| | | | |
|---|---|---|---|
| 6,115,501 A | 9/2000 | Chun et al. | |
| 6,125,144 A | 9/2000 | Matsumura | |
| 6,141,381 A | 10/2000 | Sugiyama | |
| 6,201,896 B1 | 3/2001 | Ishikawa | |
| 6,212,234 B1 | 4/2001 | Andoh et al. | |
| 6,233,279 B1 | 5/2001 | Boon | |
| 6,272,179 B1 | 8/2001 | Kadono | |
| 6,289,049 B1 | 9/2001 | Kim et al. | |
| 6,359,929 B1 | 3/2002 | Boon | |
| 6,381,277 B1 | 4/2002 | Chun et al. | |
| 6,389,072 B1 | 5/2002 | Tzou et al. | |
| 6,400,763 B1 | 6/2002 | Wee | |
| 6,414,995 B2 | 7/2002 | Okumura et al. | |
| 6,418,166 B1 | 7/2002 | Wu et al. | |
| 6,473,463 B2 | 10/2002 | Agarwal | |
| 6,501,860 B1 | 12/2002 | Charrier et al. | |
| 6,522,784 B1 | 2/2003 | Zlotnick | |
| 6,570,924 B1 | 5/2003 | Lynch et al. | |
| 6,608,865 B1 * | 8/2003 | Itoh | 375/240.08 |
| 6,661,842 B1 | 12/2003 | Abousleman | |
| 6,661,925 B1 | 12/2003 | Pianykh et al. | |
| 6,711,211 B1 | 3/2004 | Lainema | |
| 6,735,249 B1 | 5/2004 | Karczewicz et al. | |
| 6,782,053 B1 | 8/2004 | Lainema | |
| 6,826,229 B2 | 11/2004 | Kawashima et al. | |
| 6,985,527 B2 | 1/2006 | Gunter et al. | |
| 7,010,032 B1 | 3/2006 | Kikuchi et al. | |
| 7,020,204 B2 * | 3/2006 | Auvray et al. | 375/240.25 |
| 7,068,722 B2 | 6/2006 | Wells | |
| 7,116,831 B2 | 10/2006 | Mukerjee et al. | |
| 7,226,150 B2 | 6/2007 | Yoshimura et al. | |
| 7,260,148 B2 | 8/2007 | Sohm | |
| 2001/0019588 A1 | 9/2001 | Naito et al. | |
| 2001/0022815 A1 | 9/2001 | Agarwal | |
| 2002/0031272 A1 | 3/2002 | Bagni et al. | |
| 2002/0036705 A1 | 3/2002 | Lee et al. | |
| 2002/0080871 A1 | 6/2002 | Fallon et al. | |
| 2002/0141501 A1 | 10/2002 | Krishnamachari | |
| 2002/0159524 A1 | 10/2002 | Gunter et al. | |
| 2002/0168114 A1 | 11/2002 | Valente | |
| 2002/0172289 A1 | 11/2002 | Akiyoshi et al. | |
| 2003/0081850 A1 | 5/2003 | Karczewicz et al. | |
| 2004/0013308 A1 | 1/2004 | Jeon et al. | |
| 2004/0120398 A1 | 6/2004 | Zhang et al. | |
| 2004/0131117 A1 | 7/2004 | Sheraizin et al. | |
| 2006/0098738 A1 | 5/2006 | Cosman et al. | |

FOREIGN PATENT DOCUMENTS

| | | | |
|---|---|---|---|
| EP | 1351510 | | 8/2003 |
| JP | 61-092073 | | 5/1986 |
| JP | 2217088 | | 8/1990 |
| JP | 2272970 | | 11/1990 |
| JP | 02272970 A | * | 11/1990 |
| JP | 07135660 | | 5/1995 |
| JP | 8280032 A | | 10/1996 |
| JP | H9149421 | | 6/1997 |
| JP | 09-037246 | | 7/1997 |
| JP | 09-179987 | | 7/1997 |
| JP | 09-247682 | | 9/1997 |
| JP | 11262018 | | 9/1999 |
| JP | 11-289433 | | 10/1999 |
| JP | 11289544 | | 10/1999 |
| JP | 8280032 | | 11/1999 |
| JP | 11313332 | | 11/1999 |
| JP | 11513205 | | 11/1999 |
| JP | 11513205 T | | 11/1999 |
| JP | 2000197055 | | 7/2000 |
| JP | 2000350217 | | 12/2000 |
| JP | 2002010265 | | 1/2002 |
| JP | 2002-141806 | | 5/2002 |
| JP | 2002290743 | | 10/2002 |
| JP | 2003-046944 | | 2/2003 |
| JP | 2003-235044 | | 8/2003 |
| KR | 100213018 | | 8/1999 |
| KR | 100213018 B1 | | 8/1999 |
| KR | 20010030916 | | 4/2001 |
| WO | WO9904574 | | 1/1999 |
| WO | 0150770 | | 7/2001 |
| WO | WO0150770 | | 7/2001 |
| WO | 03026315 | | 3/2003 |
| WO | WO03026315 | | 3/2003 |

OTHER PUBLICATIONS

Wright, R. Glenn, et al.; "Multimedia—Electronic Technical Manual for ATE", IEEE 1996, 3 pp.

Schiller, H., et al.; "Efficient Coding of Side Information in a Low Bitrate Hybrid Image Coder", Signal Processing 19 (1990) Elsevier Science Publishers B.V. 61-73, 13 pp.

Strobach, Peter; "Tree-Structured Scene Adaptive Coder", IEEE Transactions on Communications, vol. 38, No. 4, Apr. 1990, 10 pp.

Steliaros, Michael K., et al.; "Locally-accurate motion estimation for object-based video coding", SPIE vol. 3309, 1997, 11 pp.

Martin, Graham R., et al.; "Reduced Entropy Motion Compensation Using Variable Sized Blocks", SPIE vol. 3024, 1997, 10 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Guillotel, Philippe, et al.; "Comparison of motion vector coding techniques", SPIE vol. 2308, 1994, 11 pp.

Orchard, Michael T.; "Exploiting Scene Structure in Video Coding", IEEE 1991, 5 pp.

Liu, Bede, et al.; "A simple method to segment motion field for video coding", SPIE vol. 1818, Visual Communications and Image Processing 1992, 10 pp.

Ebrahimi, Touradj, et al.; "Joint motion estimation and segmentation for very low bitrate video coding", SPIE vol. 2501, 1995, 12 pp.

Karczewicz, Maria, et al.; "Video Coding Using Motion Compensation With Polynomial Motion Vector Fields", IEEE COMSOC EURASIP, First International Workshop on Wireless Image/Video Communications—Sep. 1996, 6 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wiegand, Thomas, et al.; "Long-Term Memory Motion-Compensated Prediction", Publication Unknown, Date Unknown, 15 pp.

Zhang, Kui, et al.; "Variable Block Size Video Coding With Motion Prediction and Motion Segmentation", SPIE vol. 2419, 1995, 9 pp.

Chen, Michael C., et al.; "Design and Optimization of a Differentially Coded Variable Block Size Motion Compensation System", IEEE 1996, 4 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Nicolas, H., et al.; "Region-based motion estimation using deterministic relaxation schemes for image sequence coding", IEEE 1992, 4 pp.

Luttrell, Max, et al.; "Simulation Results for Modified Error Resilient Syntax With Data Partitioning and RVLC", ITU-Telecommunications Standardization Sector, Study Group 16, Video Coding Experts Group (Question 15), Sixth Meeting: Seoul, South Korea, Nov. 2, 1998, 34 pp.

(56) References Cited

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.

Japanese Office Action in related matter. JP2013117983, mailed Apr. 1, 2014.

* cited by examiner

DYNAMIC COEFFICIENT REORDERING

CROSS-REFERENCE TO RELATED APPLICATIONS

This application is a continuation of U.S. patent application Ser. No. 10/713,807, filed on Nov. 14, 2003, which claims priority from U.S. Provisional Application No. 60/469,187, filed on May 12, 2003. U.S. patent application Ser. No. 10/713,807 and U.S. Provisional Application No. 60/469,187 are both incorporated herein by reference in their entirety.

TECHNICAL FIELD

The invention relates to video data and more specifically to methods and systems of coding, decoding, compressing, and transmitting video data in as efficient a manner as possible.

BACKGROUND

The transmission of data is usually constrained by bandwidth and throughput limitations. One cannot send or receive an infinite amount of information in an infinitesimal amount of time. In order to maximize the amount and quality of information being transmitted, in some cases the information is compressed or coded for transmission and uncompressed or decoded upon reception.

One area in which data compression is essential is in the transmission of video data. Ordinary text, unless voluminous, is easily and quickly transmitted. However, video data can include aspects of color, brightness, and often stereo audio information. A large amount of data is required to define even short video clips. The transmission and coding of such data must be as efficient as possible, i.e., it must require as little information as possible to be transmitted.

Video compression is a subset of the general technique of data compression, whereby a signal is squeezed or compressed into a smaller set of numbers. These numbers will then take up less space on a hard drive, or take less time to transmit over a network. Before the numbers are used again, a decompression algorithm is applied to expand the series of numbers to its original (or at least a similar) form.

Video compression utilizes the fact that the signal is known to originate as digitized video, in order to increase the compression ratio, or the amount of squeezing that can be applied to the series of numbers to be stored or transmitted. Significant compression of video and audio are considered lossy algorithms because they discard or lose some portion of the original information; the reconstructed number series does not exactly match the original. This is acceptable because the precision with which we view video and audio, compared to the resolution of the digitization process, is not perfect. While the video signal may become slightly distorted, it is still recognizable. The degree to which a compression algorithm faithfully reproduces the original signal with minimum distortion or loss is a measure of the success of the algorithm.

There are a number of good reasons to compress video and audio signals, including technical issues and cost of equipment. one overriding issue is the cost of transmitting data. As the Internet matures into the de facto data transport platform for the 21st century, analog media such as videotape, film, and broadcast will be supplanted by a digital media infrastructure built on the Internet and Internet-related technologies. This digital infrastructure will allow data to be transferred between any two computing machines on the planet, if so desired. However, the speed at which this data can be sent will depend on a number of factors. In the limiting case, copper wires laid down over a century ago and intended for analog voice communications are used with modem technology (modem stands for Modulation/DEModulation) to transmit data at speeds as low as 9600 bits per second. Similar speeds are used to carry voice over wireless networks such as cellular. Recently, cable modem, DSL, and satellite technologies have brought six-figure data rates (100,000 to 1 million bits/second) to home users. For high-end applications, optical fiber enables data rates into the gigabit range (billions of bits per second) and beyond.

Whatever the data rate available for a given application, transmitting data costs money. At the present time, the cost of sending one megabyte (8 million bits) over the Internet usually costs anywhere from 5 cents at low volume, down to as low as one cent at extremely high volume (this figure does not include the cost at the receiving end). Therefore, the cost of transporting a megabyte of data from one place to another is always more than a penny.

Much work has been done in the field of video data compression. Some of the features of video codecs in existence include Discrete Cosine Transform compression, entropy coding, and differential coding of motion vectors. Prior codecs also utilize reference frames so that if a data packet is lost or corrupted, the data can be retrieved by referring to a reference frame. All of these features and difficulties therewith will be discussed in greater detail below.

In DCT (Discrete Cosine Transform) based video compression systems, an 8 by 8 block of pixel or prediction error signal data is transformed into a set of 64 frequency coefficients (a DC value and 63 AC values), which are then quantized and converted into a set of tokens.

Typically the higher frequency AC coefficients are smaller in magnitude and hence less likely to be non zero (i.e., more likely to be zero) following quantization. Consequently, prior to tokenization, the coefficients are often arranged in ascending order starting with the lowest frequency coefficient (the DC value) and finishing with the highest frequency AC coefficient. This scan order, sometimes referred to as "zig-zag order", tends to group together the non-zero values at the start and the zero values into runs at the end and by so doing facilitates more efficient compression.

However, this fixed scan order is seldom optimal. For example, when encoding interlaced video material, certain high frequency coefficients are much more prominent. This fact is reflected in the prior art where there are examples of codecs (for example MPEG-2), that mandate an alternative scan order for use when coding interlaced video.

When optimizing a codec for a specific hardware device, it is important to make sure that full use is made of any facilities that the device may offer for performing multiple tasks in parallel and to limit the extent to which individual parts of the decode process become bottlenecks.

The instant invention's bitstream, in common with most other video codecs, can broadly speaking be described as comprising entropy coded tokens that can be divided into two main categories: predictor or P tokens and prediction error or E tokens. P tokens are tokens describing the method or mode used to code a block or region of an image and tokens describing motion between one frame and another. E tokens are used to code any residual error that results from an imperfect prediction.

Entropy coding is a process whereby the representation of a specific P or E token in the bitstream is optimized according to the frequency of that token in the bitstream or the likelihood that it will occur at a particular position. For example, a token that occurs very frequently will be represented using a smaller number of bits than a token that occurs infrequently.

Two of the most common entropy coding techniques are Huffman Coding and arithmetic coding. In Huffman coding each token is represented by a variable length pattern of bits (or a code). Arithmetic coding is a more computationally complex technique but it removes the restriction of using a whole number of bits for each token. Using an arithmetic coder, it is perfectly possible to code a very common token at an average cost of 2% of a bit.

Many multimedia devices have a co-processor unit that is well suited to the task of entropy coding and a more versatile main processor. Consequently, for the purpose of parallelization, the process of encoding or decoding a bitstream is often divided into entropy related tasks and non entropy related tasks. However, for a given video clip, as the data rate increases, the number of tokens to encode/decode rises sharply and entropy coding may become a bottleneck.

With a conventional bitstream it is very difficult to redistribute the computational load of entropy coding to eliminate this bottleneck. In particular, on the decode side, the tokens must normally be decoded one at a time and in the order in which they were encoded. It is also extremely difficult to mix methods or entropy encoding (for example Huffman and arithmetic coding) other than at the frame level.

By convention, most modern video codecs code the (x, y) components of a motion vector, using a differential coding scheme. That is, each vector is coded relative to the previous vector. For example, consider two vectors (7,3) and (8,4). In this case the second vector would be encoded as (1,1), that is (7+1, 3+1).

This scheme works well if most blocks or regions for which a motion vector is coded exhibit motion that is similar to that of their neighbors. This can often be shown to be the case, for example when panning. However, it works less well if the motion field is irregular or where there are frequent transitions between background and foreground regions which have different motion characteristics.

For most modern video codecs, motion prediction is an important part of the compression process. Motion prediction is a process whereby the motion of objects or regions of the image is modeled over one or more frames and one or more 'motion vectors' is transmitted in the bitstream to represent this motion. In most cases it is not possible to perfectly model the motion within an image, so it is necessary to code a residual error signal in addition to the motion information.

In essence, each motion vector points to a region in a previously encoded frame that is similar to the region in the current frame that is to be encoded. The residual error signal is obtained by subtracting the predicted value of each pixel from the actual value in the current frame.

Many modern video codecs extend the process by providing support for prediction of motion to sub pixel accuracy, e.g, half-pixel or quarter-pixel motion estimation. To create fractional pixel data points, it is necessary to use some form of interpolation function or filter applied to real (i.e. full pixel aligned) data points.

Early codecs generally used simple bilinear interpolation as shown in Figure 1 attached hereto. In this example, A, B, C, and D are full-pixel aligned data points and x, y, and z are half-pixel aligned points. Point x is half-pixel aligned in the X direction and can be calculated using the equation:

$$x=(A+B)/2. \quad (1)$$

Point y is half-pixel aligned in the Y direction and can be calculated using the equation:

$$y=(A+C)/2. \quad (2)$$

Point z is half-pixel aligned in both X and Y can be calculated using the equation:

$$z=(A+B+C+D)/2. \quad (3)$$

Later codecs have tended to move towards the use of more complex interpolation filters, such as bicubic filters, that are less inclined to blur the image. In the example shown in Figure 2, x is a half-pixel point that lies half way between two full pixel aligned pointes B and C. Using an integer approximation to a bicubic filter it can be calculated using the equation:

$$x=(-A+9B+9C-D)/16. \quad (4)$$

Though filters such as the one illustrated above tend to produce sharper looking results, their repeated application over several frames can in some situations result in unpleasant artifacts such as false textures or false contouring.

When transmitting compressed video data over an unreliable or questionable data link, it is important that a mechanism exists for recovering when data is lost or corrupted, as video codecs are often extremely sensitive to errors in the bitstream.

Various techniques and protocols exist for the reliable transmission of data of such links, and these typically rely upon detection of the errors and either re-transmission or the use of additional data bits that allow certain types of error to be corrected. In many situations the existing techniques are adequate, but in the case of video conferencing over restricted bandwidth links neither of the above mentioned approaches is ideal. Re-transmission of lost data packets may not be practical because it is likely to cause an increased end to end lag, while the use of error correction bits or packets may not be acceptable in situations where bandwidth is already severely restricted.

An alternative approach is simply to detect the error at the decoder and report it to the encoder. The encoder can then transmit a recovery frame to the decoder. Note that this approach may not be appropriate if the error rate on the link is very high, e.g., more than one error in every 10-20 frames.

The simplest form of recovery frame is a key frame (or intra only frame). This is a frame that does not have any dependencies on previous frames or the data therein. The problem with key frames is that they are usually relatively large.

SUMMARY

Disclosed herein are aspects of systems, methods, and apparatuses for encoding and decoding video signals.

One aspect of the disclosed implementations is a method of compressing video data having at least one frame having at least one block having an array of pixels. The method includes transforming the pixels of the at least one block into coefficients; creating a default transmission order of the coefficients; creating an optimal transmission order of the coefficients; comparing a coefficient position of at least one of the coefficients in the optimal transmission order with a coefficient position of the at least one of the coefficients in the default transmission order; determining an update value based on the comparison, the update value indicative of whether the coefficient position of the at least one of the coefficients in the optimal transmission order is the same as the coefficient position of the at least one of the coefficients in the default transmission order; and selectively encoding position information of the at least one of the coefficients in the optimal transmission order based on the update value.

Another aspect of the disclosed implementations is an apparatus for compressing video data having at least one frame having at least one block having an array of pixels. The apparatus comprises a memory and a processor configured to execute instructions stored in the memory to: transform the pixels of the at least one block into coefficients; create a default transmission order of the coefficients; create an optimal transmission order of the coefficients; compare a coefficient position of at least one of the coefficients in the optimal transmission order with a coefficient position of the at least one of the coefficients in the default transmission order; determine an update value based on the comparison, the update value indicative of whether the coefficient position of the at least one of the coefficients in the optimal transmission order is the same as the coefficient position of the at least one of the coefficients in the default transmission order; and selectively encode position information of the at least one of the coefficients of the optimal transmission order based on the update value.

Another aspect of the disclosed implementations is an apparatus for compressing video data having at least one frame having at least one block having an array of pixels. The apparatus includes means for transforming the pixels of the at least one block into coefficients; means for creating a default transmission order of the coefficients; means for creating an optimal transmission order of the coefficients; means for comparing a coefficient position of at least one of the coefficients in the optimal transmission order with a coefficient position of the at least one of the coefficients in the default transmission order; means for determining an update value based on the comparison, the update value indicative of whether the coefficient position of the at least one of the coefficients in the optimal transmission order is the same as the coefficient position of the at least one of the coefficients in the default transmission order; and means for selectively encoding position information of the at least one of the coefficients in the optimal transmission order based on the update value.

It is an object of the invention to provide a video compression method and codec that is efficient and reliable.

It is another object of the invention to provide a video compression method and codec that can perform discrete cosine transforms in an adaptive manner.

It is another object of the invention to provide a video compression method and codec that performs entropy coding that optimizes the resources of the hardware devices being employed.

It is another object of the invention to provide a video compression method and codec that enhances motion vector coding.

It is another object of the invention to provide a video compression method and codec that accurately and efficiently performs fractional pixel motion prediction.

It is another object of the invention to provide a video compression method and codec that performs error recovery efficiently, even in the environment of a video conference.

The above and other objects are fulfilled by the invention, which is a method of compressing video data having at least one frame having at least one block and each block having an array of pixels. The disclosure includes at least one of the following steps: I) transforming the pixels of each block into coefficients and creating an optimal transmission order of the coefficients; II) optimizing the speed of processing compressed video data by partitioning the data bitstream and coding each partition independently; III) predicting fractional pixel motion by selecting an interpolation method for each given plurality of pixels depending upon at least one metric related to each given block; and IV) enhancing error recovery for a current frame using a frame prior to the frame immediately before the current frame as the only reference frame for lessening quality loss during data transmission.

As for the coefficient reordering aspect of the invention, the method transforms the pixels of each block into coefficients, each coefficient having a coefficient position and a value and determines a position value related to each coefficient position. An optimal transmission order of coefficients is then created based on the position values of each coefficient position, and the coefficients are transmitted in the order so determined. Preferably, the transmission order of coefficients is dynamically re-ordered for each frame of video data. The transforming step preferably transforms the pixels into discrete cosine transform coefficients. The transmission order of coefficients may be transmitted along with the coefficients. Preferably, each block has the same number of coefficients and coefficient positions, and each corresponding respective coefficient position conveys the same respective information from block to block.

In an effort to reduce the amount of data being transmitted, the transmission of coefficient order data may be limited to changes in the coefficient order from one frame to the next frame. Alternatively or in addition, the transmission order may be consolidated into bands of coefficients, each band having a plurality of coefficients organized by rank in numbers determined above. In this case, only band information may be transmitted along with the coefficients. Preferably, only band information will be transmitted where a coefficient changes bands from one frame to the next. As another alternative, all band information may always be transmitted.

Reordering the coefficients can also include the provision of a key frame. The inventive method may provide such a key frame which is always completely self-encoded and requires no information from or about a previous frame. In such a case, the encoder determines if a given frame is a key frame. If it is determined that the given frame is a key frame, the entire transmission order of coefficients for the key frame is transmitted. If it is determined that the given frame is not a key frame, only changes in the transmission order of coefficients from the previous frame to the given frame are transmitted.

As mentioned above, the invention contemplates optimizing the speed of processing compressed video data by partitioning the data bitstream and coding each partition independently. Specifically, the invention divides the video data into at least two data partitions and selects an optimal entropy coding method for each data partition. The entropy coding methods thus selected are applied respectively to each data partition. In one embodiment, the video data is divided into a predictor token data partition and an error token data partition; preferably, each data partition undergoes a different entropy coding method, such as Huffman coding and arithmetic coding. The various decoding processes of the different data partitions may be performed asynchronously and/or independently. This may be accomplished by providing at least two subprocessors in the hardware, wherein one data partition is decoded by one subprocessor and another data partition is decoded by another subprocessor. Determining which entropy coding method is to be used for a given data partition may be based on the size of the given data partition.

In one embodiment of the method and codec, the predictor token data partition is read and converted into a predictor block. The error token data partition is also read and is converted into coefficients and thence an error block. The predictor block and the error block are summed to form an image block. As mentioned above, it is preferable to provide at least two subprocessors, wherein some of these steps are performed on one subprocessor and the rest of the steps are performed on another subprocessor. Specifically, the steps of reading the error token data partition and converting the error token data partition into coefficients are preferably performed by a fast entropy optimized subprocessor, and the other steps are preferably performed by a general purpose subprocessor.

The method optimizes decoder performance of the bitstream in a way that avoids data and code cache misses. As many distinct functions of the decoder's code as can fit into the code cache are stored there. The code from this step is run for as many blocks as can fit into the data cache. The next set of distinct functions of the decoder's code and then collected, and the process is repeated until all of the bitstream has been read and each of the blocks of data have been produced.

Another aspect of optimizing decoder performance of the bitstream optimizes the utilization of the subprocessors by assigning each subtask to a separate processor. Preferably, the portion of the decoder that reads error tokens from the bitstream and translates them into coefficients is run on a fast entropy optimized subprocessor. The portion of the decoder that reads the predictor tokens from the bitstream and builds a filtered predictor block from these tokens is run on a subprocessor with fast access to memory. The portion of the decoder that translates the transform coefficients from the above step into an error signal is run on a subprocessor that has an optimized implementation of the transform coder, and the portion of the decoder that adds the predictor block to the error signal is run on a subprocessor optimized for motion compensation.

The video data may be divided into two data partitions, a first data partition representing a first area of the frame and a second data partition representing a second area of the frame (e.g,. upper and lower halves or left and right halves). Alternatively, the video data may be divided into three data partitions, each respectively representing level, saturation, and hue information of the frame. In another version, the three data partitions could respectively represent cyan, magenta, and yellow information of the frame.

As mentioned before, the invention includes the aspect of predicting fractional pixel motion by selecting an interpolation method for each given plurality of pixels depending upon at least one metric related to each given block. Specifically, the value of the at least one metric associated with a given plurality of pixels to encode is determined, and an interpolation method of encoding the given plurality of pixels is selected depending upon the value of the at least one metric determined. The interpolation method thus selected is applied to the given plurality of pixels to encode, and the process is repeated steps for each successive plurality of pixels. The at least one metric may be at least one of motion vector length and a complexity factor. The interpolation methods may include bilinear, bicubic, quadratic, and B-spline interpolation. The given plurality of pixels may be an entire frame or a sub-portion thereof. If the motion vector length associated with the given plurality of pixels is determined to be less than the predetermined length value and the complexity factor associated with the given plurality of pixels is determined to be greater than the predetermined complexity value, then bicubic interpolation is selected. A predetermined length value and the predetermined complexity value is preferably set one time for a given number of pluralities of pixels, and possibly once per frame.

The complexity factor is preferably a variance of the given plurality of pixels, calculated as $$C = (n\,Ex_i^2 - (Ex_i)^2)/n^2 \qquad (4)$$

As mentioned above, the invention includes enhancing error recovery for a current frame using a frame prior to the frame immediately before the current frame as the only reference frame for lessening quality loss during data transmission. Specifically, the invention includes using a frame coded prior to the last frame as the only reference frame for a given frame in order to lessen the quality loss associated with transmission over lines which produce lost or corrupt packets. This step is limited to at least one of periodically (every F frames) and arbitrarily (based on some other criteria).

This aspect of the invention is particularly well-suited for a video conference. Specifically, each party to a video conference compresses frames of video data and transmits the compressed video data to the other parties with packets that are marked such that the loss or corruption of a packet is detectable. If any party detects that a packet is lost or corrupted, the detecting party signals the sending party to send an update frame that has been encoded using a reference frame that has already been successfully received and decoded by all of the remaining parties.

The invention may preferably use reference frames in the following manner. A fixed interval F of video frames may be selected by the encoder and transmitted to the decoder. Every F'th frame is encoded using only the previous encoded F'th frame for reference. Every non F'th frame is encoded using the prior frame as reference. Each frame of video is transmitted to the decoder so that loss and corruption are detectable. All of these steps preferably occur at the encoder. On the decoder side, the coded video data is received from the encoder and decoded by the decoder. If a packet is lost and the lost packet is associated with a non F'th frame, the decoder waits for the next F'th frame to recover the lost packet.

As another alternative, the invention encodes a current frame at least one of periodically and arbitrarily at a higher than ambient quality determined by a metric of statistics taken from this and prior coded frames and stores the encoded current frame for usage by subsequent frames as a secondary reference frame.

Variations in these and other aspects will be described in additional detail hereafter.

DETAILED DESCRIPTION

Several different aspects of the invention will be described hereinafter.

Dynamic Coefficient Reordering

In DCT (Discrete Cosine Transform) based video compression systems an 8 by 8 block of pixel or prediction error signal data is transformed into a set of 64 frequency coefficients (a DC value and 63 AC values), which are then quantized and converted into a set of tokens.

Typically the higher frequency AC coefficients are smaller in magnitude and hence less likely to be non zero following quantization. Consequently, prior to tokenization the coefficients are often arranged into ascending order starting with the lowest frequency coefficient (the DC value) and finishing with the highest frequency AC coefficient. This scan order, sometimes referred to as "zig-zag order", tends to group together the non-zero values at the start and the zero values into runs at the end and by so doing facilitates more efficient compression.

However, this fixed scan order is seldom optimal. For example, when encoding interlaced video material, certain high frequency coefficients are much more prominent. This fact is reflected in the prior art where there are examples of codecs (for example MPEG-2), that mandate an alternative scan order for use when coding interlaced video.

One aspect of the invention is a method whereby a codec can optionally customize the scan order in which coefficients are encoded to more optimally reflect the characteristics of a particular data set.

According to this invention the codec maintains a record of the distribution of zero vs. non-zero values for each of the DCT coefficients, in one or more frames of video. This record is used to create a custom scan order where coefficients that are more likely to be non-zero appear earlier in the list.

The codec may optionally collate additional information such as the average magnitude of the non-zero values for each coefficient and use this to further optimize the scan order.

The overhead of transmitting a new custom scan order, or updating a previously transmitted scan order, may in some cases negate the benefit gained from improved coefficient coding efficiency. Hence, a cost benefit analysis may be necessary to determine if the update provides a net benefit.

The main factors affecting the outcome of this analysis are the cost of update, the number of blocks (and hence coefficients) to be encoded and the extent to which the new scan order deviates from either a standard scan order or a previously encoded scan order.

For an 8×8 element DCT, coding a "complete" custom scan order (i.e., a new position for every one of the 64 coefficients), would require 384 bits (64 coefficients×6 bits each). This cost is likely to be prohibitive unless the number of blocks (and hence coefficients) to be coded is very large or the optimum scan order differs very significantly from the default scan order (this being either a standard scan order or one previously encoded). The rationale behind this statement is that if the default scan order is similar to the custom scan order, then the average number of bits saved coding each block is likely to be small, hence a large number of blocks must be coded to justify the overhead of updating the scan order. Conversely if the default scan order is dissimilar to the custom scan order, then the average saving per block is likely to be high.

A simple way to improve this situation would be to only code changes to the scan order. For example, for each coefficient, code a bit to indicate whether it has changed its position in the scan order and then if appropriate its new position. Though this will typically result in a lower update cost, the worst case scenario here is where the new scan order is different for all coefficients, in which case the cost of update would be 448 bits (64×7).

An attractive aspect of such an approach is that the cost of update is lowest where the custom and default scan order are most similar (and hence the likely cost saving per block is at its lowest), and highest when they are most dissimilar.

The situation can be improved still further by considering cost benefit at the level of individual coefficients or pairs of coefficients. Consider, for example, a case where two coefficients are adjacent to one another in the scan order and where the likelihood of a non-zero value is almost identical for both. A small change in the number of non-zero values for one or other of the two coefficients could cause them to swap places in the custom scan order. To encode this change would mean updating the scan position for both coefficients at a cost of 14 bits (assuming the update model above). However, the saving achieved might be negligible. This problem is particularly relevant in respect of the high order AC coefficients. Here, the frequency of non-zero values is typically very low and even a tiny change could cause a coefficients' position in the scan order to change significantly.

While it is certainly feasible to base the calculation of a custom scan order purely upon the distribution of zeros vs. non-zeros for each coefficient, there are other factors that are relevant. As mentioned previously, one of these is the average magnitude of the non-zero values. Another is the fact that in some cases a positive correlation may exist between the values of one or more coefficients. For example, between a low order "pure horizontal" AC coefficient and higher order 'pure horizontal' coefficients. In such cases, unless there is a substantial difference in the prevalence of non-zero values, it may be preferable to keep them in their original order (lowest frequency to highest frequency).

The preferred implementation of this aspect of the invention goes some way to addressing such issues whilst further reducing the cost of updating the scan order. The procedure for creating a custom scan order is broadly as follows:

(a) The DC coefficient is always coded first (position 0)

(b) Order the AC coefficients into descending order based upon the proportion of the values that are non-zero for each coefficient.

(c) Split the ordered list into 16 variable sized bands (see table 1)

(d) Within each band re-order into zig-zag scan order.

Note that the subdivision into 16 bands as shown in Table 1 is based upon empirical observations with a range of different test clips and is not necessarily optimal.

TABLE 1

Preferred scan order coefficient bands

| Band | First coefficient | Last coefficient |
|---|---|---|
| 0 | 1 | 1 |
| 1 | 2 | 4 |
| 2 | 5 | 10 |
| 3 | 11 | 12 |
| 4 | 13 | 15 |
| 5 | 16 | 19 |
| 6 | 20 | 21 |
| 7 | 22 | 26 |
| 8 | 27 | 28 |
| 9 | 29 | 34 |
| 10 | 35 | 36 |
| 11 | 37 | 42 |
| 12 | 43 | 48 |
| 13 | 49 | 53 |
| 14 | 54 | 57 |
| 15 | 58 | 63 |

Empirical experiments show that this banding strategy gives results that are usually as good as and often better than those obtained using a scan order based purely upon the proportion of the values that are non zero; even before the cost of update is taken into account.

The second advantage is that the cost of updating the scan order is greatly reduced because it is only necessary to update a value when it moves from one band to another. Further, only 4 bits are needed to code a change in band.

A final optimization used in the preferred implementation is based upon the observation that some coefficients change bands much more frequently than others. For example, the high order AC coefficients tend to change bands less often than the low order coefficients.

If a particular coefficient is only updated 2% of the time, for example, then it is wasteful to use 1 bit to indicate whether or not it is to be updated on a given frame. By using arithmetic coding techniques and assigning empirically determined update probabilities to each coefficient, it is possible to get the average update cost substantially below 1 bit per coefficient.

The following "C" code segments give supporting detail of the preferred implementation of this aspect of the invention.

```
// Work out a new "preferred" scan order using the zero/non-zero frequency data
// that has been collected.
void CalculateScanOrder ( CP_INSTANCE *cpi ) {
    UINT32 i, j, k;
    UINT32 Sum;
    UINT32 tmp[2];
    UINT32 NzValue [BLOCK_SIZE][2]; UINT32 GroupStartPoint, GroupEndPoint;
    // For each coefficient, calculate the proportion of the values that 11 were non-zero as a scaled number from 0-255.
    for ( i=1; i<BLOCK_SIZE; i++ )
    {
    Sum = cpi->FrameNzCount[i][0J + cpi->FrameNzCount[i][1]; if( Sum )
        NzValue [i][0] = (cpi->FrameNzCount[i][I]*255)/Sum; else
        NzValue [i] [0] = 0;
    NzValue [i][1] = i;
    }
// Sort into decending order
for ( i=1; i<BLOCK SIZE-1; i++ )
{
    for ( j =i+1; j>1; j-- )
    {
        if ( NzValue [j][0] > NzValue [j-l][0] ) {
            // Swap them over
            tmp[O] = NzValue [j- MO]; tmp[1] = NzValue [j-l][1];
            NzValue [j-I][0] =NzValue [j][0]; NzValue [j-l][1] = NzValue [j][1];
            NzValue [j][0] = tmp[O]; NzValue [j][1] = tmp[1];
        }
    }
}
//Split into bands and then re-sort within each band
// into ascending order based upon zig-zag scan position
GroupEndPoint = 0;
for ( k=0; k<SCAN_ORDER BANDS; k++ ) {
    GroupStartPoint = GroupEndPoint + 1;
    GroupEndPoint EndpointLookup[k];
    for ( i=GroupStartPoint; i<GroupEndPoint; i++ )
    {
        for ( j =i+1; j>GroupStartPoint; j-- )
        {
            if( NzValue [j][1] < NzValue [j-1][l] ) {
                // Swap them over
                tmp[O] = NzValue U-1][0];
                tmp[1] =NzValue [j-l][1];
                NzValue [j-I][0] = NzValue [j][0];
                NzValue [1-1][1] = NzValue NzValue [j][0] = tmp[0];
            }
        }
        // For each coef index mark its band number
        for ( i=GroupStartPoint; i<<GroupEndPoint; i++ )
        {
            // Note the new scan band number for each coef.
            // NzValue [i][1] is the position of the coef in the traditional
            // zig-zag scan order, i is the position in the new scan order and /I k is the band number,
            cpi->NewScanOrderBands[ NzValue [i][1J ] = k;
        }
    }
}
// This structure gives scan order update probabilities (scaled to the range of 1-255)
// for each of the dct coefficients (in traditional zig-zag order). The values are passed
// to the function "nDecodeBoolO" and indicate the probability that the result will be 0
// (FALSE).
//
const UINT8 ScanBandUpdateProbs[BLOCK SIZE] _
{
    255, 132, 132, 159, 153, 151, 161, 170,
    164, 162, 136, 110, 103, 114, 129, 118,
    124, 125, 132, 136, 114, 110, 142, 135,
    134, 123, 143, 126, 153, 183, 166, 161,
    171, 180, 179, 164, 203, 218, 225, 217,
    215, 206, 203, 217, 229, 241, 248, 243,
    253, 255, 253, 255, 255, 255, 255, 255,
    255, 255, 255, 255, 255, 255, 255, 255
};
// Reads updates to the scan order if they are available for this frame.
void UpdateScanOrder( PB INSTANCE*pbi )
{
    // Is the scan order being updated this frame?
    If (nDecodeBool( 128 ) )
    {
        // Read in the those scan bands that have been updated for (i = l; i < BLOCK SIZE; i++ )
        for (i = l; i < BLOCK SIZE; i++ )
            { U Has the band for this coefficient been updated?
```

```
            if( nDecodeBool( ScanBandUpdateProbs[i] ) )
            {
                pbi->ScanBands[i] = VP6_bitread( SCAN_BAND UPDATE BITS );
            }
        //Build the new scan order from the scan bands data BuildScanOrder( pbi, pbi->ScanBands );
    }
}
// Builds a custom scan order from a set of scan band data,
void BuildScanOrder( P8 _INSTANCE *pbi, UINT8 *ScanBands ) {
    UINT32 i, j;
    UINT32 ScanOrderIndex =1;
    // DC is fixed pbi->ModifedScanOrder[O] = 0;
    // Create a scan order where within each band the coefs are in ascending order
    // (in terms of their original "zig-zag" scan order positions).
    for ( i = 0; i < SCAN_ORDER BANDS; i++ ) {
        for (j = 1; j < BLOCK SIZE; j++ ) {
            if( ScanBands[j] == i ) {
                pbi->ModifiedScanOrder[ScanOrderindex] = j;
                ScanOrderindex++;
            }
        }
    }
}
```

Using Independent Bitstream Partitions to Facilitate Encoder and Decoder Optimization, and Using of Mixed Mode Entropy Coding When optimizing a codec for a specific hardware device, it is important to make sure that full use is made of any facilities that the device may offer for performing multiple tasks in parallel and to limit the extent to which individual parts of the decode process become bottlenecks.

The inventive bitstream, in common with most other video codecs, can broadly speaking be described as comprising entropy coded tokens that can be divided into two main categories.

(a) Predictor tokens (hereinafter referred to as P tokens). For example, tokens describing the method or mode used to code a block or region of an image and tokens describing motion between one frame and another.

(b) Prediction Error signal tokens (hereinafter referred to as E tokens). These are used to code any residual error that results from an imperfect prediction.

Entropy coding is a process whereby the representation of a specific P or E token in the bitstream is optimized according to the frequency of that token in the bitstream or the likelihood that it will occur at a particular position. For example, a token that occurs very frequently will be; represented using a smaller number of bits than a token that occurs infrequently.

Two of the most common entropy coding techniques are Huffman Coding and arithmetic coding. In Huffman coding each token is represented by a variable length pattern of bits (or a code). Arithmetic coding is a more computationally complex technique but it removes the restriction of using a whole number of bits for each token. Using an arithmetic coder it is perfectly possible, for example, to code a very common token at an average cost of ½ of a bit.

Many multimedia devices have a co-processor unit that is well suited to the task of entropy coding and a more versatile main processor. Consequently, for the purpose of parallelization, the process of encoding or decoding a bitstream is often divided into entropy related tasks and non entropy related tasks.

However, for a given video clip, as the data rate increases the number of tokens to encode/decode rises sharply and entropy coding may become a bottleneck.

With a conventional bitstream it is very difficult to re-distribute the computational load of entropy coding to eliminate this bottleneck. In particular, on the decode side, the tokens must normally be decoded one at a time and in the order in which they were encoded. It is also extremely difficult to mix methods or entropy encoding (for example Huffman and arithmetic coding) other than at the frame level.

This aspect of the invention is a method designed to make it easier to redistribute the computational load of entropy coding, and to facilitate the use of mixed mode entropy coding through structural changes to the bitstream.

According to this method each frame in the bitstream is divided into two or more wholly independent data partitions. The partitions may be written to or read from in parallel and are not constrained to use the same entropy encoding mechanism. This makes it easier to optimize the process of encoding or decoding to avoid entropy related bottlenecks at high bit-rates.

The ability to use both Huffman and arithmetic techniques, or a mixture of the two, within a single frame, gives the encoder the ability to better optimize the tradeoff between the amount of compression achieved and computational complexity. For example, an encoder could be configured to use the less complex Huffman method in one or more of its partitions if the projected size of a frame exceeded a given threshold.

The specific implementation of this aspect of the invention supports the use of either one or two main data partitions. In addition there is a small header partition.

When using a single data partition the codec behaves in a conventional manner. Both P and E tokens are coded using a proprietary arithmetic coder in a single data partition. This method has slightly lower overheads (a few bits per frame) but is less flexible. For example:

|  | Partition 1 |
| --- | --- |
| (block 1) | P, P, E, E, E |
| (block 2) | P, E, E, |
| (block 3) | P, P, E, E, E, |

In the second case, however, the P and E tokens are written to separate partitions. For example:

|  | Partition 1 | Partition 2 |
|---|---|---|
| (block 1) | PP | EEE |
| (block 2) | P | EE |
| (block 3) | P | EEEE |

The size of the first partition does not tend to vary as much with data rate, and is comparatively small, so this partition is always coded using the arithmetic coder. The second partition may be coded using either the arithmetic coder or the Huffman coder.

The choice of Huffman or arithmetic coding for the second partition can be signaled at the frame level. In the preferred implementation the choice depends upon the performance of the target decoder platform and the projected size in bits of the frame. Specifically, if the frame size rises above a threshold number, where there is a danger that the decoder will have problems decoding the frame in real time, then the Huffman method is used.

Encoder performance can also be an issue where real time encoding is a requirement, but with the possible exception of key frames (which tend to be larger and have no dependencies on other frames), the cost of the entropy coding is usually a smaller fraction of the total computational cost in the encoder.

The following "C" code segments give supporting detail of the preferred implementation of this aspect of the invention.

```
//This function packs the encoded video data for a frame using either one arithmetically
// coded data partition, two arithmetically coded data partitions, or one arithmetically
// coded data partition and one Huffman data partition.
//
//The argument "cpi" is a pointer to the main encoder instance data structure.
void PackCodedVideo ( CP_1NSTANCE *cpi )
{
    UINT32 PartitionTwoOffset;
    BOOL CODER *bc &cpi->bc;              // Arithmetic coder instance data structure
    B O O L CODER *bc2 &cpi->bc2;         // 2nd Arithmetic coder instance structure
    P8 ...INSTANCE *pbi = &cpi->pb;       // Decoder instance data structure
    // Initialize the raw buffer i/o used for the header partition.
    InitAddRawBitsToBuffer ( &cpi->RawBuffer, pbi->DataOutputPtr );
    // Start the arithmetic and or Huffman coders
    // If we are using two data partitions...
    if( pbi->MultiStream I I (pbi->VpProfile = SIMPLE PROFILE) )
    {
    //Start the first arithmetic coder: Allow for the raw header bytes.
    VP6_StartEncode ( bc, (pbi->DataoutputPtr + ((KeyFrame) ? 4 : 3)) );
    // Create either a second arithmetic or Huffman partition
    // This is initially written to a holding buffer "cpi->OutputBuffer2"
    if ( pbi->UseHuffman )
            InitAddRawBitsToBuffer ( &pbi->HufBuffer, cpi->OutputBuffer2 );
        else
            VP6_StartEncode ( bc2, cpi->OutputBuffer2 );
    // We are only using a single data partition coded using the arithmetic coder. else
    {
        //Start the arithmetic coder: Allow for the raw header bytes.
        VP6_StartEncode( bc, (pbi->DataOutputInPtr + ((KeyFrame) ? 2 : 1)) );
    // Write out the frame header information including size.
    WriteFrameHeader (... );
    if( pbi->UseHuffman )
        PackHufmmanCoeffs (... );
    else
        PackArithmeticCoeffs (... );
    // Stop the arithmetic coder instance used for the first data partition
    VP6_StopEncode ( be );
    //Work out the offsets to the data partitions and write them into
    // the space reserved for this information in the raw header partition.
    //
    // If we are using two data partitions....
    if( pbi->MultiStream I I (pbi->VpProfile = SIMPLE PROFILE) )
    {
        // Offset to first data partition from start of buffer
        PartitionTwoOffset = 4 + be->pos;
        //Write offset to second data partition partition.
        AddRawBitsToBuffer ( &cpi->RawBuffer, PartitionTwoOffset ,16 );
        // If Huffman was used for the second data partition ...
        if( pbi->UseHuffman )
        {
            // Flush the buffer for the Huffman coded output partition
            EndAddRawBitsToBuffer ( &pbi->HuffBuffer );
            // Copy the Huffman coded data from the holding buffer into the output buffer.
            memcpy ( &cpi->RawBuffer.Buffer[ PartitionTwoOffset ], pbi->HuffBuffer.Buffer, pbi->HuffBuffer.pos );
            // Stop the arithmetic coder instance used by the second data partition.
            VP6_StopEncode ( bc2 );
            //Copy over the contents of the holding buffer used by
            //the second partition into the output buffer.
            >DataOutputInPtr[ PartitionTwoOffset ],
                    bc2.buffer, bc2.pos );
        }
    )
    // Stop and flush the raw bits encoder used for the header
```

```
        EndAddRawBitsToBuffer ( &cpi->RawBuffer );
}
//This function is called to select the coding strategy when using two data partitions.
void SelectMultiStreamMethod ( CP_INSTANCE *pbi )
{
    // Calculate an estimated cost (Shannon entropy) for the frame using
    // the information gathered re, the distribution of tokens in the frame.
    // Add in the previously calculated cost estimate for coding any mode and 11 motion vector information.
    EstimatedFrameCost = VP6_ShannonCost( cpi ) + ModeMvCost;
    // Decide whether to drop using Huffman coding for the second data partition. )
    if ( EstimatedFrameCost > HuffmanCodingThreshold ) pbi->UseHuffman = TRUE;
    else
      pbi->UseHuffman = FALSE;
}
```

Using a Plurality of Filters to Enhance Fractional Pixel Motion Prediction in Video Codecs For most modem video codecs motion prediction is an important part of the compression process. Motion prediction is a process whereby the motion of objects or regions of the image is modeled over one or more frames and one or more motion vectors is transmitted in the bitstream to represent this motion. In most cases it is not possible to perfectly model the motion within an image, so it is necessary to code a residual error signal in addition to the motion information, In essence, each motion vector points to a region in a previously encoded frame that is similar to the region in the current frame that is to be encoded. The residual error signal is obtained by subtracting the predicted value of each pixel from the actual value in the current frame.

Many modem video codecs extend the process by providing support for prediction of motion to sub pixel accuracy. For example half pixel or quarter pixel motion estimation. To create fractional pixel data points it is necessary to use some form of interpolation function or filter applied to real (i.e. full pixel aligned) data points.

Early codecs generally used simple bilinear interpolation

| A | x | B |
| y | z |   |
| C |   | D |

In this example, A, B, C, and D are full pixel aligned data points and x, y, and z are half pixel aligned points. Point x is half pixel aligned in the X direction and can be calculated using the formula: $x=(A+B)/2$. Point y is half pixel aligned in the Y direction and can be calculated using the formula: $y=(A+C)/2$. Point z is half pixel aligned in both X and Y can be calculated using the formula: $z=(A+B+C+D)/2$.

Later codecs have tended to move towards the use of more complex interpolation filters, such as bicubic filters, that are less inclined to blur the image. In the following example x is a half pixel point that lies half way between two full pixel aligned pointes B and C. Using an integer approximation to a bicubic filter it can be calculated using the formula: $x=(-A+9B+9C-D)/16$.

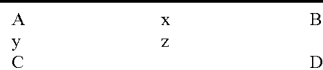

Though filters such as the one illustrated above tend to produce sharper looking results, their repeated application over several frames can in some situations result in unpleasant artifacts such as false textures or false contouring.

This aspect of the invention is a method where by a codec can use a mixture of filtering techniques to create more optimal fractional pixel predictors and select between these methods at the clip level, the frame level, the block level or even at the level of individual pixels.

In the preferred implementation a selection can be made on a per frame basis as to whether to use bilinear filtering only, bicubic filtering only or to allow a choice to be made at the block level.

Selection at the block or region level could be achieved by means of explicit signalling bits within the bitstream, but in the preferred implementation selection is made using contextual information already available in the bitstream and by means of a complexity metric applied to the full pixel aligned data values that are going to be filtered.

In situations where the quality of the motion predictor is poor (for example if it was not possible to find a good prediction for a block in the previous frame reconstruction), bilinear filtering is often the best option. Specifically where the prediction is poor the sharpening characteristics of the bicubic filter may lead to an increase in the high frequency content of the residual error signal and make it more difficult to encode.

In the absence of explicit signalling bits in the bitstream various contextually available values that can be shown to be correlated to a greater or lesser extent with poor prediction quality. One of the simplest of these is motion vector length. Specifically the quality of the prediction tends to degrade with increasing motion vector length. The smoothness of the motion field in is another possible indicator (i.e. how similar are the motion vectors of neighbouring blocks).

Bilinear filtering also tends to be the better option in situations where the choice of vector is unreliable (for example, where there is not very much detail in the image and there are many candidate vectors with similar error scores). In particular, repeated application of a bicubic filter over many frames, to a region that is relatively flat and featureless, may give rise to unwanted artifacts.

In the preferred implementation two factors are taken into account when choosing the filtering method. The first is the length of the motion vector. The second is a complexity metric C calculated by analyzing the set of full pixel aligned data points that are going to be filtered.

Bicubic filtering is used only if both the following test conditions are satisfied:

1. The motion vector is shorter than a threshold value L in both X and Y.
2. The complexity C is greater than a threshold value T.

In the preferred implementation C is a variance of a set of n data points xi calculated according to the formula:

$$C=(nExi^2-(Exi)^2)/n^2 \quad (4)$$

In the preferred implementation the complexity threshold T and the motion vector length threshold L may be set by the encoder on a once per frame basis.

The following "C" code segments give supporting detail the preferred implementation of this aspect of the invention.

```
PredictBlockFunction(... )
{
if ( pbi->PredictionFilterMode = AUTO_SBLECT PM) {
        // Use bilinear if vectors are above a threshold length in X or Y
        if( (( abs(pbi->mbi.Mv[bp].x ) > BicMvSizeLimit) II ((
        abs(pbi->mbi.Mv[bp].y ) > BicMvSizeLimit) )
        {
            FilterBlockBilinear(.., );
        }
else
        {
        //Calculate a complexity metric (variance).
        //Note: for performance reasons the variance function only
        // examines 16 data points (every other point in X and Y
        // for an 8×8 block).
        Var = Var16Point( DataPtr, Stride );
        //If the complexity is above the given threshold use bicubic else
        use bilinear
        if( Var >= pbi->PredictionFilterVarThresh )
        FilterBlockBilcubic(... );
        else FilterBlockBilinear( );
        }
}}
UINT32 Var16Point ( UINT8 *DataPtr,1NT32 Stride ) {
        UINT32 i, j;
        UINT32 XSum=O, XXSum=O;
        UINT8 *Dif f tr = DataPtr;
        //Use every other point in X and Y
        for ( i = 0; i < BLOCK HEIGHT WIDTH; I += 2 )
            for (j = 0; j < BLOCK_HEIGHT WIDTH; j += 2 )
            {
                XSum += DiffPtr[j];
                XXSum += DiffPtr[j] * DiffPtr[j];
            }
            //Step to next row of block. DiffPtr +=
            (SourceStride << 1)
        //Compute population variance as mis-match metric,
        return (( (XXSum* 16) – (XSum*XSum) ) 1256 );
}
```

Enhanced Motion Vector Coding

By convention, most modern video codecs code the (x,y) components of a motion vector, using a differential coding scheme. That is, each vector is coded relative to the previous vector. For example, consider two vectors (7,3) and (8,4). In this case the second vector would be encoded as (1,1), that is (7+1, 3+1).

This scheme works well if most blocks or regions for which a motion vector is coded exhibit motion that is similar to that of their neighbours. This can often be shown to be the case, for example when panning. However, it works less well if the motion field is irregular or where there are frequent transitions between background and foreground regions which have different motion characteristics.

This aspect of the invention is an alternative strategy for encoding motion vectors which retains the advantages of differential coding whilst being more tolerant of irregular fields and background foreground transitions.

According to this invention, the codec maintains two or more reference vectors relative to which motion vectors may be encoded. The codec could switch between these reference vectors via explicit signalling bits within the bitstream, but in the preferred implementation the decision is based upon the coding methods and motion vectors used by the blocks' immediate neighbours.

In the preferred implementation, a block may be coded as and intra block (with no dependency on any previous frames), or an inter block which is dependent upon either the previous frame reconstruction, or an alternative reference frame that is updated only periodically.

When coding with respect to the previous frame reconstruction or the alternative reference frame, the invention supports the following coding mode choices.

(a) Code with no motion vector (that is to say an implicit (0,0) vector)

(b) Code using the same vector as the 'nearest' neighbouring.

(c) Code using the same vector as the 'next nearest' neighbour.

(d) Code using a new motion vector.

When defining the nearest or next nearest neighbour, only blocks that are coded with respect to the same reference frame as the current block and those that are coded with a non-zero motion vector are considered. All other blocks are ignored.

When defining the next nearest neighbour, blocks that are coded with the same vector as the nearest neighbour are also ignored.

When coding a new motion vector the codec may use either (0,0) or the nearest vector as the reference vector. In the preferred implementation the nearest vector is used if the block from which it is derived is either the block immediately to the left or immediately above the current block (assuming that blocks are being coded from left to right and from top to bottom). In all other cases new vectors are coded with respect to (0,0).

Several extensions to the basic method are possible. If the nearest and next nearest neighbours are the blocks immediately to the left and immediately above the current block respectively, then some sort of compound vector derived from the two could be used as a reference for coding the new vector. Alternatively 'nearest' could be used to predict the x component and 'next nearest' the y component.

Another possible extension, still assuming that nearest and next nearest are the blocks immediately to the left and above the current block, would be to take special account of the case where the nearest and next nearest vectors are not similar, and in such a case revert to 0 as the reference value for x, y or both x and y.

This method retains the benefits of simple differential coding in cases where there is a regular or slowly changing motion field. However, the use of special 'no vector', 'nearest' and 'next nearest' modes makes for more efficient coding of transitions between foreground and background and the ability to switch automatically between multiple coding origins makes the method more tolerant of irregular motion fields.

The following "C" code segments give supporting detail of the preferred implementation of this aspect of the invention.

```
// This function determines whether or not there is a qualifying nearest and next
// nearest neighbour for the current block, what the motion vectors are for those
// and how close the nearest neighbour is.
//
void VP6_FindNearestandNextNearest( PB_INSTANCE *pbi,
                        UINT32 MBrow,
                        UINT32 MBcol,
                        UINT8 ReferenceFrame
```

```
                         INT32 * Type )
{
    int i;
    UINT32 OffsetMB;
    UINT32 BaseMB = MBOffset(MBrow,MBcol);
    MOTION VECTOR ThisMv;
    //Set default outcome
      *Type = NONEAREST_MACROBLOCK;
    // Search for a qualifying "nearest" block
    for ( i=0; i<12 ; i++ )
    {
        OffsetMB = pbi->mvNearOffset[i] + BaseMB;
        // Was the block coded with respect to the same reference frame?
        if ( VP6_Mode2Frame[pbi->predictionMode[OffsetMB]] 1= ReferenceFrame) continue;
        // What if any motion vector did it use
        ThisMv.x = pbi->MBMotionVector[OffsetMB].x; ThisMv.y = pbi->MBMotionVector[OffsetMB].y;
        //If it was non-zero then we have a qualifying neighbour
        if ( ThisMv.x 11 ThisMv.y )
            Nearest.x = ThisMv.x;
            Nearest.y = ThisMv.y;
            *Type = NONEAR_MACROBLOCK;
            break; }
    pbi->mbi.NearestMvIndex = i;
    // Search for a qualifying "next nearest" block for ( i=i+1; i<12; i++ )
    {
    OffsetMB = pbi->mvNearOffset[i] + BaseMB;
    //Was the block coded with respect to the same reference frame?
    if ( VP6_Mode2Frame[pbi->predictionMode[OffsetMB]] != ReferenceFrame)
            continue;
    // What if any motion vector did it use
    ThisMv.x = pbi->MBMotionVector[OffsetMB].x;
    ThisMv.y = pbi->MBMotionVector[OffsetMB].y;
    // If this vector is the same as the "nearest" vector then ignore it.
    if( (ThisMv.x == Nearest.x) && (ThisMv.y Nearest,y) )
            continue;
    // If it was non-zero then we have a qualifying neighbour
    if( ThisMv.x 1I ThisMv.y )
    {
        NextNearest.x ThisMv.x;
        NextNearest.y ThisMv.y;
        *Type = MACROBLOCK;
        break;
    }
}
```

Using An Alternate Reference Frame in Error Recover

When transmitting compressed video data over an unreliable data link it is important that a mechanism exists for recovering when data is lost or corrupted, as video codecs are often extremely sensitive to errors in the bitstream.

Various techniques and protocols exist for the reliable transmission of data of such links and these typically rely upon detection of the errors and either re-transmission or the use of additional data bits that allow certain types of error to be corrected.

In many situations the existing techniques are adequate but in the case of video conferencing over restricted bandwidth links neither of the above mentioned approaches is ideal. Re-transmission of lost data packets may not be practical because it is likely to cause an increased end to end lag, whilst the use of error correction bits or packets may not be acceptable in situations where bandwidth is already severely restricted.

An alternative approach is simply to detect the error at the decoder and report it to the encoder. The encoder can then transmit a recovery frame to the decoder. Note that this approach may not be appropriate if the error rate on the link is very high. For example, more than one error in every 10-20 frames.

The simplest form of recovery frame is a key frame (or intra only frame). This is a frame that does not have any dependencies on previous frames or the data therein. The problem with key frames is that they are usually relatively large.

Disclosed herein is a mechanism whereby a codec maintains a one or more additional references frames (other than the reconstruction of the previously coded frame) that can be used as a starting point for more efficiently coding of recovery frames.

In the preferred implementation of the invention the codec maintains a second reference frame which is updated whenever there is a key frame and optionally at other times, via a flag bit in the frame header. For example the encoder could choose to update the second reference frame once every 'X' seconds or whenever an error recovery frame is encoded.

Provided that the content of the second reference frame is at least in some respects similar to the content of the current frame, differential coding with respect to the second reference frame is likely to be much cheaper than coding a key frame.

There are several ways in which one or more alternate reference frames may be used to enhance compression quality or efficiency. One obvious usage that is covered in the prior art is in video sequences that oscillate back and forth between two or more different scenes. For example, consider an interview where the video switches back and forth between interviewer and interviewee. By storing separate reference frames as a baseline for each camera angle the cost of switching back and forth between these can be greatly reduced, particularly when the scenes are substantially different.

Whilst the invention has the option of using an alternate reference frame in this way, the subject of this invention is the use of a periodically updated alternate reference frame to enhance the quality of compressed video is situations where there is a slow progressive change in the video. Good examples of this are slow pans, zooms, or tracking shots.

According this aspect of the invention, during slow pans or other such slow progressive changes the encoder periodically The extent of the quality boost also depends to some extent on the ambient quality with a larger boost being used when the ambient quality is low and a smaller boost when the ambient quality is high.

The following pseudo code gives more detail of the preferred implementation of this aspect of the invention.

---

For each frame
    Calculate of the average amplitude of the X and Y motion vector components (AvX and AvY) specified in pixel units.
    MotionSpeed = the larger of AvX and AvY
    Calculate a variance number for the X and Y motion vector components (VarianceX and VarianceY).
    MaxVariance = the larger of VarianceX and VarianceY
    MotionComplexity = MotionSpeed + (VarianceX 14) + (VarianceY l 4)
    If a second reference frame update is due this frame
        Calculate a data rate % boost number (Boost) based upon the predicted quality index (actually a quantizer setting)
for the frame, This can range between +0% at highest quality to +1250% when the quality level is very low.
        Multiply Boost by a MotionSpeed correction factor where the factor can vary between 1 for very small values of
MotionSpeed to 0 for large values of MotionSpeed.
        Apply a further correction factor to Boost based upon the extent to which the second reference frame has been used in the
previous few frames. This can vary from 1/16 in cases where the second reference frame was not used at all in the previous few
frames up to 1 in cases where it was used for 15% or more of the coded blocks.
        A series of tests are then applied to determine whether or not to go ahead and update the second reference frame with the
calculated % boost.

--- inserts frames which are encoded at a significantly higher quality than the surrounding frames and which cause the second or alternative reference frame to be updated.

The purpose of these higher quality "second reference update" frames is to re-instate detail that has incrementally been lost since the last key frame, or the last second reference update, and to provide a better basis for inter frame prediction in subsequent frames. This strategy of periodically raising the quality (and hence the data rate) and at the same time updating the second reference frame can be shown to provide a much better cost/quality trade off in some situations than simply coding all the frames at a similar quality.

Central to an effective implementation is the method for determining an appropriate interval for the second reference updates and the amount by which the quality or data rate should be boosted.

In the preferred implementation of this aspect of the invention, several factors are taken into account. These include:

(a) The average amplitude of motion vectors in the preceding few frames as an indicator of the speed of motion.

(b) The extent to which the motion field is correlated. For example are the motion vectors all fairly similar.

(c) The extent to which the second reference frame has been used as a predictor in preference to the previous frame reconstruction in the previous few frames.

(d) The ambient quality or quantizer setting.

In cases where the average amplitude of the motion vectors used is high (indicating faster motion), the interval between second reference updates and the quality boost are both decreased. Conversely, where the motion is slow a larger quality boost and longer interval are used.

In cases where the motion field is highly correlated, that is to say that there are a lot of similar motion vectors, the quality boost for second reference frame updates is increased. Conversely, when the motion field is poorly correlated the extent of the boost is decreased.

In cases where the second reference frame is frequently being used as a predictor in preference to the previous frame reconstruction, the quality boost is increased. Conversely in cases where the second reference frame is not used frequently it is decreased.

The principal tests are:

(Boost>MinBoostTreshold) and (MotionSpeed<MaxMotionSpeedThreshold) and (MaxVariance<MaxVarianceThreshold) where MinBoostTreshold, MaxMotionSpeedThreshold and MaxVarianceThreshold are configurable parameters.

The invention has a number of special "motion re-use" modes that allow the motion vector for a block to be coded more cheaply if it is the same as the motion vector used by one of its near neighbours. Further tests are applied to discount cases where the usage of these modes falls below a threshold level.

If the decision is made to apply the boost and update the second reference frame then set the frame data rate target to the baseline value+Boost % and calculate and the interval until the next update based upon MotionSpeed.

If the decision is made not to apply the boost and not to update the second reference frame, then update the frame as normal with a 0% data rate boost.

Else if a second reference frame update is not due, calculate a reduced frame data rate target (negative boost) that takes into account the level of boost applied when the second reference frame was last updated and the current update interval.

Using a Reconstruction Error Metric to Select Between Alternative Methods for Creating Fractional Pixel Predictions Many modern video codecs support prediction of motion to sub pixel accuracy. For example half pixel or quarter pixel motion estimation. To create fractional pixel data points it is necessary to use some form of interpolation function or filter applied to real (i.e., full pixel aligned) data points.

Early codecs generally used simple bilinear interpolation.

| | |
|---|---|
| A | x |
| y | z |
| C | |

In this example A, B, C, and D are full pixel aligned data points and x,y and z are half pixel aligned points.

Point x is half pixel aligned in the X direction and would be calculated using the formula (A+B/2).

Point y is half pixel aligned in the Y direction and would be calculated using the formula (A+C/2).

Point z is half pixel aligned in both X and Y would be calculated using the formula (A+B+C+D /2) .

Later codecs have tended to move towards the use of more complex interpolation filters such as bicubic filters, that are less inclined to blur the image. In the following example 'x' is a half pixel point that lies half way between two full pixel aligned pointes B and C. It can be calculated using the formula (−A+9B+9C−D)/16.

A B×C D

Though filters such as the one illustrated above tend to produce sharper results, repeated application over several frames can sometimes result in unpleasant artifacts such as exaggeration of textures or false contouring.

This aspect of the invention is a method where by a codec can use a mixture of bilinear and bicubic filtering to calculate more optimal fractional pixel predictors and select between these methods either at a frame level or at the level of the individual blocks or regions to which motion vectors are applied.

Selection at the block or region level could be achieved by means of signalling bits within the bitstream, but in the preferred implementation selection is made by means of a complexity metric applied to the set of pixels in the previous reconstructed image that are going to be filtered.

According to this method, blocks or regions with a complexity score above a threshold value "T" are filtered using the bicubic method whilst those with a lower complexity score are filtered using the bilinear method.

In the preferred implementation the complexity metric is the variance of the set of "n" full pixel aligned data points to be filtered, where variance is defined as:

$$(nEx^2-(Ex)^2)/n^2. \quad (5)$$

In the preferred implementation the threshold value T' may be updated on a once per frame basis.

What is claimed is:

1. A method of compressing video data, the method comprising:
   transforming an array of pixels of a block of a frame of the video data into coefficients;
   creating a default transmission order of the coefficients of the block;
   creating an optimal transmission order of the coefficients of the block;
   comparing a coefficient position of a coefficient from the coefficients in the optimal transmission order with a coefficient position of the coefficient in the default transmission order;
   determining an update value based on the comparison, the update value indicative of whether the coefficient position of the coefficient in the optimal transmission order is the same as the coefficient position of the coefficient in the default transmission order; and
   selectively encoding position information of the coefficient in the optimal transmission order based on the update value,
   wherein the position information is at least one of the coefficient position or band information, the band information indicating a position of a group of coefficients.

2. The method of claim 1, further comprising:
   transmitting, the coefficients and the optimal transmission order of the coefficients.

3. The method of claim 2, further comprising:
   limiting the transmission of the optimal transmission order to changes in coefficient order from a current frame to a next frame.

4. The method of claim 1, further comprising:
   consolidating the optimal transmission order of the coefficients into bands of coefficients, each band having a plurality of coefficients organized according to the default transmission order; and
   selectively encoding only the band information and the coefficients.

5. The method of claim 4, wherein selectively encoding only the band information and the coefficients comprises only transmitting the band information when a coefficient changes bands from a current frame to a next frame.

6. The method of claim 4, wherein selectively encoding only the band information and the coefficients comprises always transmitting all the band information.

7. The method of claim 1, further comprising:
   determining if a given frame is a key frame;
   if it is determined that the given frame is a key frame, transmitting the entire optimal transmission order of the coefficients for the given frame; and
   if it is determined that the given frame is not a key frame, transmitting only changes in coefficient order of the coefficients from a previous frame to the given frame.

8. The method of claim 1, wherein the optimal transmission order of the coefficients is created for each frame of the video data.

9. The method of claim 1, wherein transforming the pixels of the block into coefficients comprises:
   transforming the pixels of the block into discrete cosine transform coefficients.

10. The method of claim 1, wherein the frame includes a plurality of blocks that includes the block and wherein each block from the plurality of blocks has the same number of coefficients and coefficient positions.

11. The method of claim 1, wherein each corresponding respective coefficient position conveys the same information from block to block.

12. An apparatus for compressing video data, the apparatus, comprising:
   a memory; and
   a processor configured to execute instructions stored in the memory to:
   transform an array of pixels of a block of a frame of the video data into coefficients;
   create a default transmission order of the coefficients of the block;
   create an optimal transmission order of the coefficients of the block;
   compare a coefficient position of a coefficient from the coefficients in the optimal transmission order with a coefficient position of the coefficient in the default transmission order;
   determine an update value based on the comparison, the update value indicative of whether the coefficient position of the coefficient in the optimal transmission order is the same as the coefficient position of the coefficient in the default transmission order; and
   selectively encode position information of the coefficient in the optimal transmission order based on the update value,
   wherein the position information is at least one of the coefficient position or band information, the band information indicating a position of a group of coefficients.

13. The apparatus of claim 12, wherein the instructions further comprises instructions to:

consolidate the optimal transmission order of the coefficients into bands of coefficients, each band having a plurality of coefficients organized according to the default transmission order.

14. The apparatus of claim 13, wherein the instructions further comprise instructions to:
selectively encode only the band information and the coefficients.

15. The apparatus of claim 14, wherein the instructions to selectively encode only the band information and the coefficients comprise instructions to:
only transmit the band information when a coefficient changes bands from a current frame to a next frame.

16. The apparatus of claim 12, wherein the instructions further comprise instructions to:
determine if a given frame is a key frame;
if it is determined that the given frame is a key frame, transmit the entire optimal transmission order of the coefficients for the given frame; and
if it is determined that the given frame is not a key frame, transmit only changes in coefficient order of the coefficients from a previous frame to the given frame.

* * * * *